United States Patent [19]
Ellis et al.

[11] Patent Number: 5,367,977
[45] Date of Patent: * Nov. 29, 1994

[54] SYSTEM, APPARATUS AND METHOD FOR RAPIDLY ATTACHING A BOAT COVER OR CANOPY TO A WINDSHIELD AND FRAME

[75] Inventors: Jeffrey W. Ellis, Cocoa; John W. Hamilton, Mims; John M. Owens, Merritt Island, all of Fla.; Steven A. Callahan, Knoxville, Tenn.

[73] Assignee: Ray Industries, Inc., Knoxville, Tenn.

[*] Notice: The portion of the term of this patent subsequent to Jun. 1, 2010 has been disclaimed.

[21] Appl. No.: 68,441

[22] Filed: May 27, 1993

Related U.S. Application Data

[63] Continuation-in-part of Ser. No. 794,148, Nov. 19, 1991, Pat. No. 5,215,032.

[51] Int. Cl.5 .............................................. B63B 17/00
[52] U.S. Cl. .................................................... 114/361
[58] Field of Search ............... 114/343, 361; 403/165, 403/187, 263, 267, 315, 357, 397; 135/87, 88

[56] References Cited

U.S. PATENT DOCUMENTS

| | | | |
|---|---|---|---|
| 2,937,652 | 5/1960 | Zimmer et al. | 114/361 |
| 2,961,725 | 11/1960 | McGee | 114/361 |
| 3,021,535 | 7/1962 | Dorst | 114/361 |
| 3,093,845 | 6/1963 | Brock et al. | 114/361 |
| 3,172,419 | 3/1965 | Lewis | 114/361 |
| 3,930,738 | 1/1976 | Thuss et al. | 403/294 |
| 4,750,449 | 6/1988 | Muhlberger | 114/361 |
| 4,993,351 | 2/1991 | Zirkelbach et al. | 114/361 |

Primary Examiner—Stephen P. Avila
Attorney, Agent, or Firm—Malin, Haley, DiMaggio & Crosby

[57] ABSTRACT

A boat canopy is rapidly attached and detached to a windshield with a continuous flexible member having a flat plate joined to the inside surface of the periphery of the canopy, with a lateral riser and first and second locking segments extending from the riser. The locking segments are pushed into a continuous, upwardly and outwardly facing slot arrangement of a corresponding gripping member fixed to the upper extremity of the boat windshield. The sides of the canopy are rapidly attached and detached to a side frame of the windshield through the use of detent pins extending through lateral holes in the side frame extrusion and the ends of the canopy struts.

8 Claims, 3 Drawing Sheets

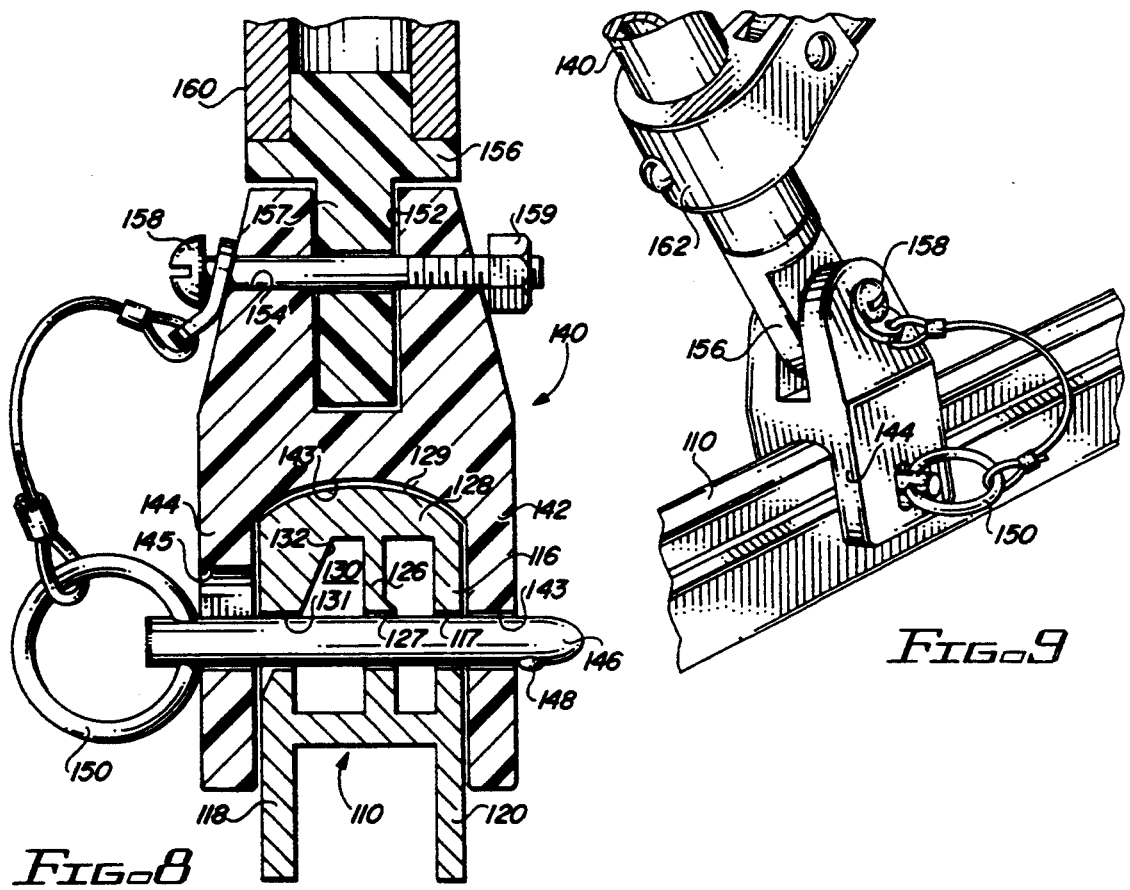
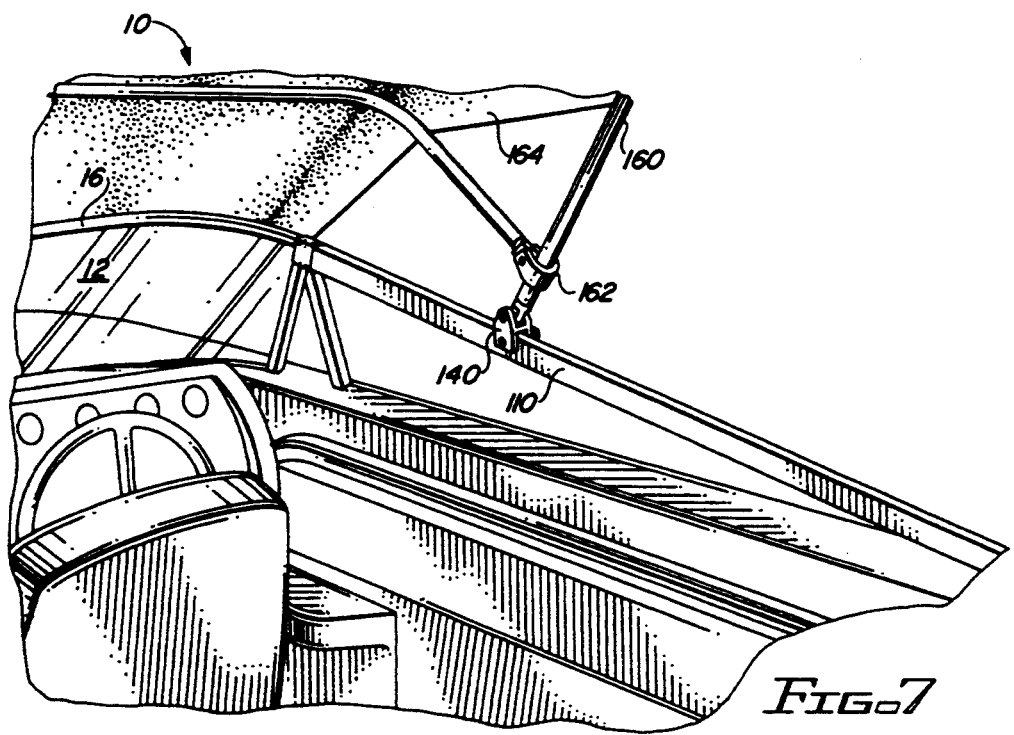

SYSTEM, APPARATUS AND METHOD FOR RAPIDLY ATTACHING A BOAT COVER OR CANOPY TO A WINDSHIELD AND FRAME

This application is a continuation-in-part of application Ser. No. 07/794,148 filed Nov. 19, 1991 now U.S. Pat. No. 5,215,032.

BACKGROUND OF THE INVENTION

1. Field of the Invention

The present invention relates to systems, apparatus and methods for attaching a flexible canopy to a boat windshield and frame.

2. Description of the Prior Art

A variety of techniques have been described in the prior art for attaching a canopy or similar cover to a fixed structure, such as a boat windshield. Typically, metal fastening systems are utilized along the edge of the fixed structure, with mating fasteners on the cover. Examples of such arrangements are shown in the following U.S. Pat. Nos: 4,750,449 to Muhlberger; 2,961,725 to McGhie; 2,937,652 to Zimmer et al; 3,416,282 to Daugherty; 3,093,845 to Brock et al; 2,961,725 to McGee; 3,021,535 to Dorst; 3,930,738 to Thuss et al; and 4,993,351 to Zirkelbach et al. Canadian Patent 685,026 is also of interest.

Continuous flexible fasteners are also well known in the prior art. Such arrangements employ a flexible bead or similar structure which is pressed continuously into a slot or channel for locking, and then is removed by pulling the bead away from the slot. However, such arrangements have not been generally used in the past for large structures, because of the requirements for strength, rigidity and resistance to wind loading. Where used on boat windshield attachment systems, such prior art fastening arrangements have tended to be inconvenient to use.

SUMMARY OF THE INVENTION

The present invention is a system, apparatus and method for rapidly attaching a canopy or similar cover to a fixed structure, such as a boat windshield, in an arrangement utilizing a flexible locking member which permits rapid attachment and detachment to and from a boat windshield or similar fixed structure in a simple and convenient manner, and which also provides sufficient strength and rigidity to achieve desired resistance to wind loading and other adverse environmental conditions.

The present invention contemplates the use of a gripping member and a flexible member which are designed to mate together in a locking arrangement. The flexible member is attached continuously to the inside surface of the canopy or cover along its peripheral edge, the flexible member having a flat plate attached along the inside of the periphery and extending parallel with the canopy, riser means extending lateral to the plane of the canopy and the flat plate, and first and second locking segments attached to and extending lateral to the riser means. The gripping member is fixed to the upper extremity of the fixed structure, for example a boat windshield, and has at least one continuous, outwardly-facing slot means extending generally parallel with the upper extremity of the boat windshield and dimensioned to receive the first and second locking segments of the flexible member.

In a preferred embodiment of this invention, a first one of the segments extends forward from the riser means toward the periphery of the canopy, and second segment extends rearward from the riser means and away from the periphery, the rearward segment having a tapered surface which mates with a corresponding tapered surface in an internal recess of the gripping member. The forward segment is substantially thinner in cross sectional dimension than the rearward segment, thereby imparting greater flexibility to that forward segment. The slot means of the gripping member is defined by at least one tab which engages the extremity of the forward segment of the first portion of the flexible member, in a manner which permits rapid unlocking of the entire flexible member from the internal recess of the gripping member. The flexible member is dimensioned and configured for rapid insertion into the internal recess, by first drawing the boat canopy downwardly over the gripping member, and then extending the rearward segment of the flexible member through the slot and into the internal recess of the gripping member, and then pushing the forward segment and the first, lateral riser portion of the flexible member through the slot and into the internal recess. Thereafter, the flexible member may be unlocked from the gripping member by rotating the peripheral edge of the canopy upward and away from the gripping member, thereby unlocking the forward segment from the gripping member. The forward and rearward segments of the flexible member, and the slot and internal recess of the gripping member are so designed as to permit a rolling disengagement of the flexible member in a manner which avoids inadvertent unlocking, until a positive force is exerted in an upward lateral direction along the peripheral edge of the boat canopy, thus avoiding inadvertent unlocking in high wind loading conditions.

The rapid attachment system of the present invention also comprises means for attaching the boat canopy to a side frame of the windshield, and includes a plastic fitting for engaging the side frame in a quick-release manner.

Other features of the present invention will be appreciated by those skilled in the art upon a review of the drawings and detailed description, set forth below.

THE DRAWINGS

FIG. 7 is a perspective view of the system for rapidly attaching a boat canopy to both the windshield and frame, as viewed from the passenger area of an associated boat.

FIG. 8 is a cross sectional elevation of a side frame attachment portion of the system illustrated in FIG. 7.

FIG. 9 is a perspective view of the side frame portion of the attachment system shown in FIGS. 7 and 8, as viewed from outside of the associated boat.

DETAILED DESCRIPTION OF THE PREFERRED EMBODIMENT

A preferred embodiment of the present invention will now be described with reference to the drawings.

Figure 1:
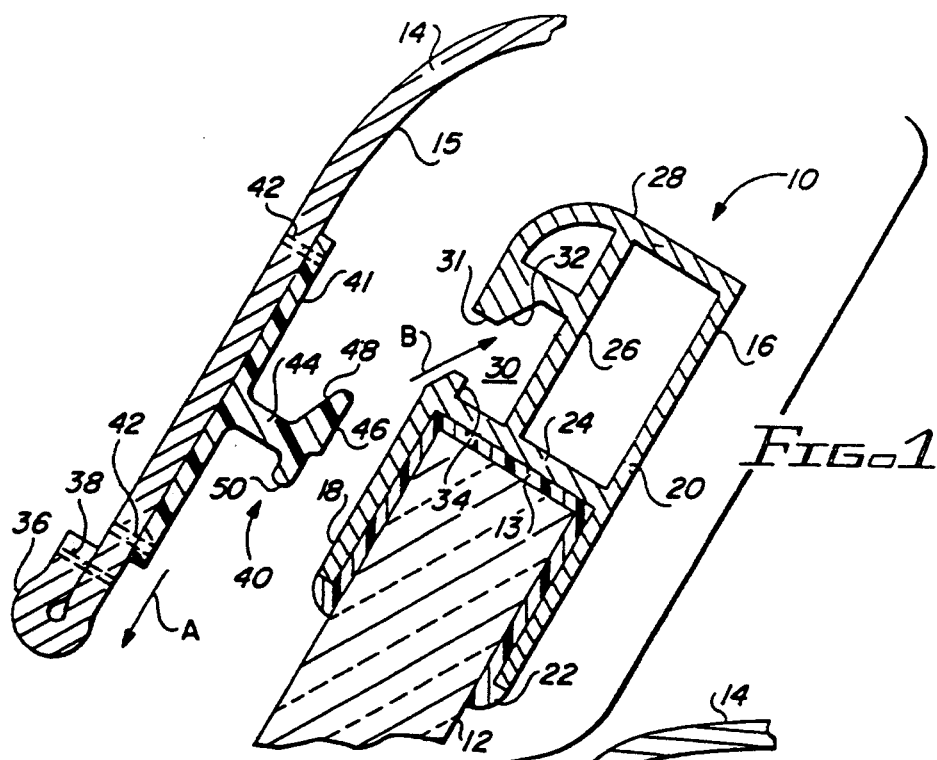
FIG. 1 is a cross section of a boat canopy and windshield embodiment employing the gripping and locking system of the present invention, particularly illustrating the manner in which the locking operation is first initiated.

Reference is first made to FIG. 1 where a boat windshield and canopy assembly, referred to generally by the reference numeral 10, is shown for purposes of illustrating the system of the present invention for rapidly attaching a canopy or cover continuously to a fixed structure. In FIG. 1, the assembly 10 includes a boat windshield 12 having an upper extremity 13, and a boat canopy 14 having an inside surface 15. In accordance with the present invention, there is provided a gripping member 16 formed of an extrusion of a suitable material, for example aluminum, having a pair of arms 18, 20 and an internal plate 24 adapted to fit across the upper extremity 13 of the boat windshield 12, and along its sides, as shown. Suitably, a gasket material 22 is inserted between the gripping member 16 and the boat windshield 12. The extrusion 16 includes an internal plate 26 extending from plate 24 to curved plate 28 defining the upper extremity of the gripping member 16. The radius of the upper plate 28 is not critical, but is intended to provide a rounded surface for the boat canopy 14, and its associated flexible member which is described in greater detail below.

With continued reference to FIG. 1, the gripping member 16 includes an internal recess 30 communicating with a slot 31, which slot extends generally parallel with the boat windshield. The slot 31 is defined by the extremities of the arm 18 and the upward radial plate 28. The internal recess 30 is defined by a tapered surface 32.

The flexible member 40 is defined by a flat plate 41, a first portion, or riser 44 extending laterally from the plate 40 and first and second locking segments 46 and 50 which extend, respectively, in forward and rearward directions with respect to the peripheral edge 36 of the canopy 14 in the embodiment of FIGS. 1–4. The plate 40, the riser 44 and the first and second locking segments 46, 50 comprise an integrally molded flexible member which is attached to the inside surface 15 of the canopy 14 by threads 42, adjacent the rolled periphery 36 of the canopy 14.

As is shown in FIG. 1, the second locking segment 46 has an inside tapered surface 48 generally conforming to the taper of the surface 32 along the internal recess 30 of the gripping member 16.

As is further shown in FIG. 1, the forward locking segment 50 is substantially thinner in cross sectional dimension than the rearward locking segment 46, to thereby impart greater flexibility to that forward locking segment.

Figure 5:
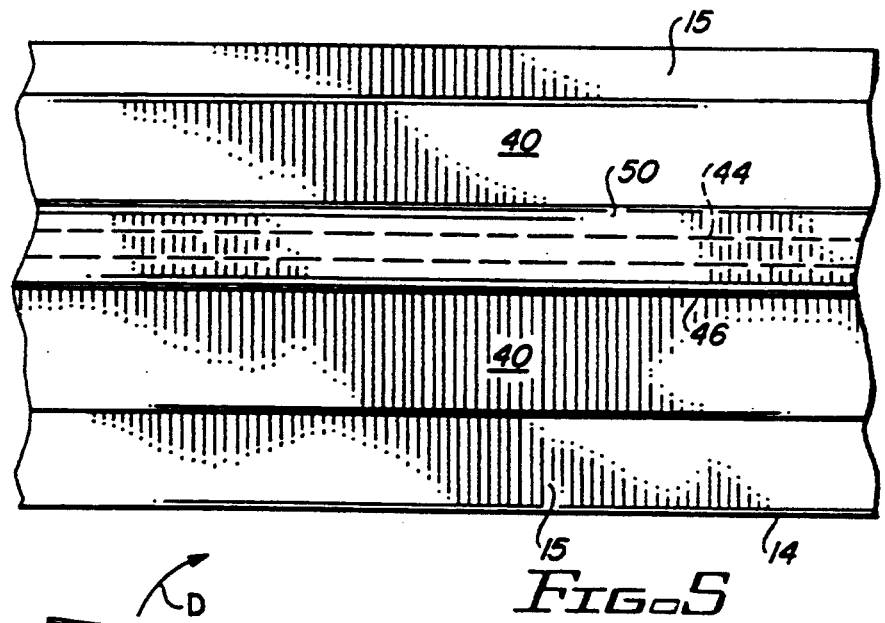
FIG. 5 is a top plan view of the flexible member attached to the inside surface of a boat canopy.

The configuration of the flexible member, including its plate 41, the first, riser portion 44 and the rearward and forward locking tabs 46, 50, respectively, when reference is made to the plan view of FIG. 5.

Referring again to FIG. 1, the flexible member 40 is locked into the gripping member 16 by first drawing the peripheral edge 36 of the boat canopy 14 downwardly and generally parallel to the boat windshield 12 as is shown by the arrow A in FIG. 1. Thereafter, the rearward locking segment 46 of the flexible member 40 is pushed through the slot 31 and across the tapered surface 32 of the internal recess 30 as is shown by the arrow B in FIG. 1. After these two steps are accomplished, a portion of the flexible member is within the internal recess 30 of the gripping member 16, as is illustrated in FIG. 2.

Figure 2:
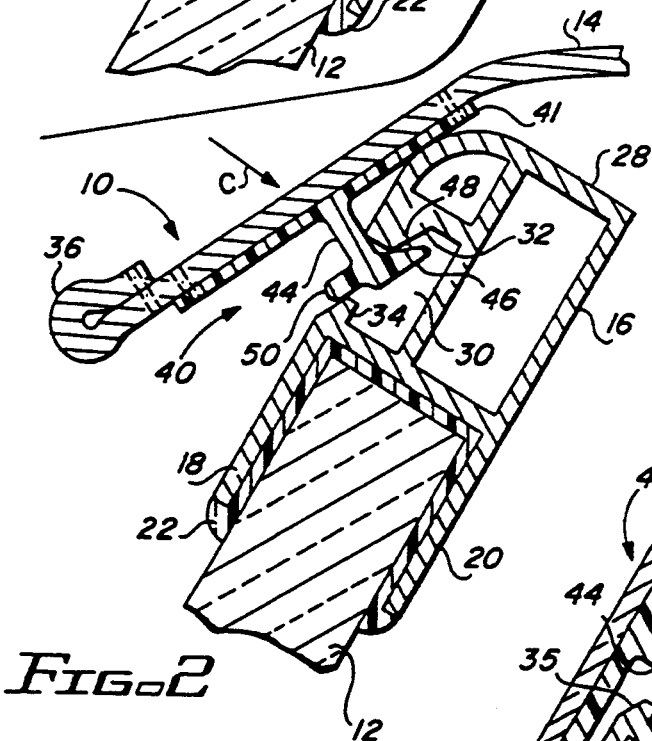
FIG. 2 is a cross section like that of FIG. 1, showing an intermediate step in the locking operation.
Figure 3:
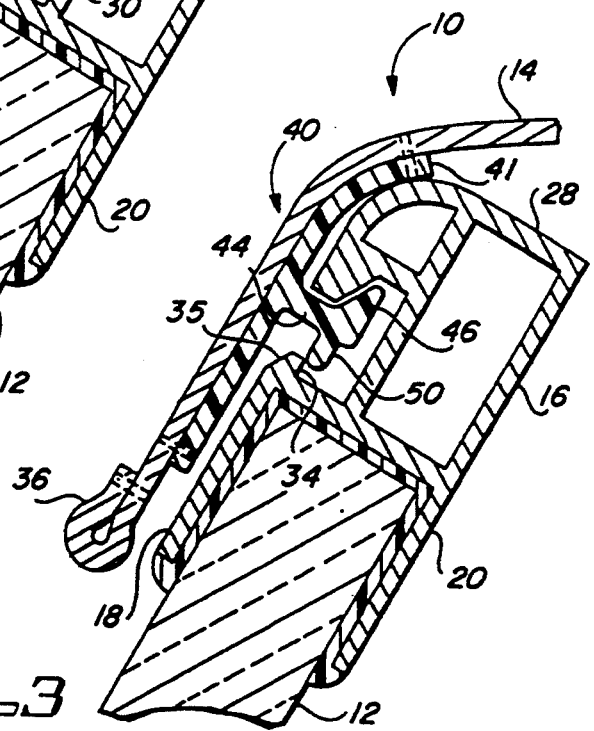
FIG. 3 is a cross section like that of FIGS. 1 and 2, illustrating the apparatus of the present invention in a locking configuration.

The locking procedure is completed in the manner shown in FIG. 2, by pushing the flexible member 40 downwardly as shown by arrow C in FIG. 2, to drive the flexible, forward locking segment 50 across the tab 34 and into the internal recess 30. The resulting configuration is shown in FIG. 3, the details of which are described next. As is shown in FIG. 3, the inside tapered surface 48 of the rearward locking segment 46 lies across the corresponding tapered surface 32 of the gripping member 16 (reference numerals 48 and 32 are omitted in FIG. 3, for clarity, but are set out in FIG. 1). As will be appreciated by those skilled in the art, the canopy 14 has a significant stretch, thereby keeping the riser portion 44 of the flexible member 40 against the rear edge of the slot 31 as defined by the plate 28. In this configuration, the forward locking segment 50 is maintained in a relationship with tab 34 to just be engaged with that tab, and is not held substantially underneath that tab, as is shown in FIG. 3. Such locking as between the tab 34 and the locking segment 50 is unnecessary, because of the tension of the canopy 14, and the configured locking arrangement between the tapered surfaces of the rearward locking segment 46 and the gripping member 16.

Figure 4:
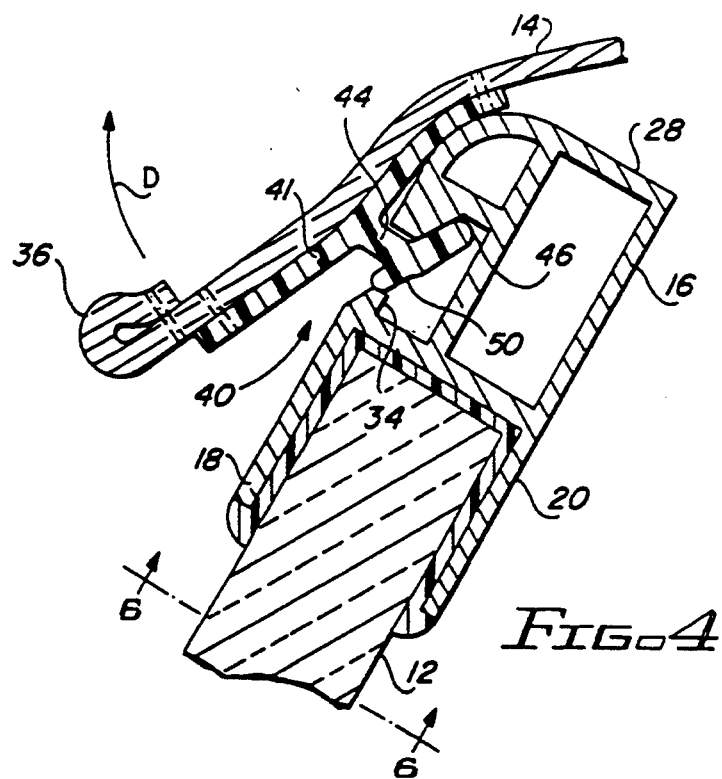
FIG. 4 is a cross section like that of FIGS. 1-3, and illustrating a step in the unlocking of the flexible member associated with the boat canopy from the gripping member on the boat windshield.

Reference is now made to FIG. 4. When it is desired to unlock the flexible member 40 from the gripping member 16, the peripheral edge 36 of the canopy 14 is pulled upwardly in a direction away from the arm 18, as is shown by arrow D. As this is undertaken, the forward locking segment 50 easily moves across the extremity of the tab 34.

Figure 6:
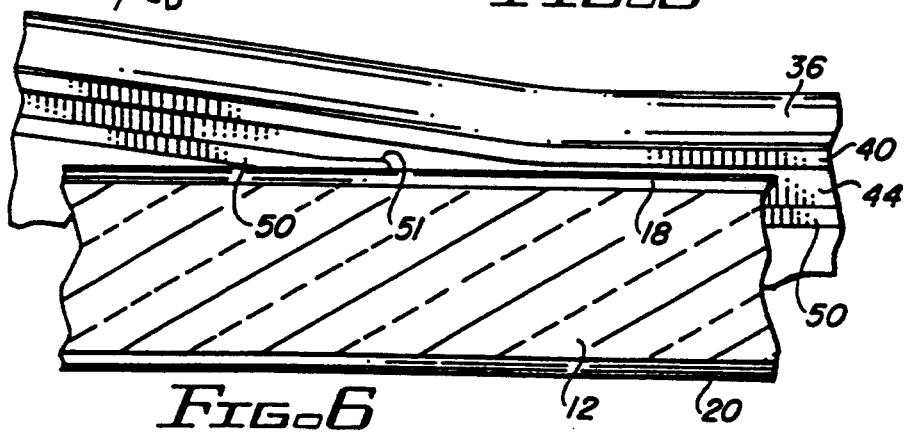
FIG. 6 is an end view of the apparatus of the present invention as shown in FIG. 4, during the unlocking operation, and in which the various elements are partially cut away.

Reference is now made to FIG. 6. As is shown, the forward locking segment 50 develops a rolled portion 51 as it unlocks from the tab 34. Again, this is achieved because the forward locking segment is both substantially flexible in relation to the rearward locking segment 46, and because the forward locking segment does not extend substantially underneath the tab 34 of the gripping member 16.

The system and method of the present invention also contemplates a facile technique for rapidly connecting and disconnecting the boat canopy to a side frame of the windshield, as will now be described with reference to FIGS. 7, 8 and 9.

Noting FIG. 7, the boat windshield includes a side frame 110, to which the boat canopy is to be rapidly attachable and detachable. Conventionally, the boat canopy includes struts 160, 164, with the second strut 164 being attached to the first strut 160 via a plastic fitting 162. The first strut 160 is then attached to the side frame 110 utilizing a rapid attach-detach system described in detail with reference to FIG. 8.

The side frame 110 of the windshield comprises an extrusion 116 having various features which are substantially identical to the gripping member 16 described in FIGS. 1 and 2 above, and which is fitted to the top of the glass forming the side window of the windshield system. In FIG. 8, the extrusion 110 has a pair of arms 18, 20 and an internal plate 124 adapted to fit across the upper extremity of the side windshield with a suitable gasket material therebetween (not shown) The extrusion 110 includes an internal plate 126 extending from the plate 124 to a curved plate 128 defining the upper extremity of the extrusion 110. The radius of the upper plate 128 is not critical, but is intended to provide a rounded surface 129. The extrusion 110 includes an internal recess 130 communicating with a slot 131, the slot extending generally parallel with the side window. The extrusion 110 differs from the gripping member 16 of FIGS. 1 and 2, in that there is provided two additional holes 117, 127 extending through the vertical plates 120, 121 respectively, in order to receive a detent pin 146. The detent pin 146 includes a detent ball 148 at one end, and a pull ring 150, and operates in a conventional manner to extend through the holes 131, 127 and 117.

In order to rapidly attach and detach the first strut 160 to the side frame extrusion 110, there is provided a plastic fitting 140 having a pair of arms 142, 144 and an internal cavity defining a curved radius 143 that is dimensioned to face against curved surface 129. The arm 142 is provided with a hole 143, and arm 144 is provided with a slot hole 145, and with the arms dimensioned such that the holes align with the holes 131, 127 and 117 when the fitting 140 is attached over the side frame extrusion 110, as shown in FIG. 8. In this manner, the detent pin 146 holds the plastic fitting 140 and the extrusion 110 together, until the detent pin 146 is removed by pulling the rings 150 to overcome the detent ball 148.

The fitting 140 includes a slot 152 and a lateral hole 154 extending across the slot 152, and is dimensioned to receive the tongue 157 of a joint member 156, which is preferably plastic and has an internal portion extending into the cylindrical cavity of the first strut 160. A fastener 158, 159 extends across the lateral hole 154 and rotatably attaches the joint member 156 with the fitting 140.

It will be appreciated by those skilled in the art that the strut system of the boat canopy is also provided with a similar quick attach-detach system on the opposite side of the boat, and may include similar attach-detach fittings at the stern of the boat as well. In this manner, the struts, including struts 160, 164, of the boat canopy may be rapidly attached and then later rapidly detached from the windshield and side frame assemblies.

The system, apparatus and method of the present invention thus provides a mechanism for rapidly attaching a canopy or cover to a boat windshield and frame, and which is suitable for use in adverse environmental circumstances.

This concludes the description of the preferred embodiments. A reading by those skilled in the art will bring to mind various changes without departing from the spirit and scope of the invention. It is intended, however, that the invention only be limited by the following appended claims.

What is claimed is:

1. A system for rapidly attaching a boat canopy comprising:
   a boat canopy having a forward, peripheral edge and an inside surface;
   a flexible member having a flat plate portion extending parallel with and joined to the inside surface of the peripheral edge of the boat canopy, the flexible member including riser means extending laterally from the flat plate portion and first and second locking segments extending laterally from the riser means;
   a boat windshield having an upper extremity;
   a gripping member fixed to the upper extremity of the boat windshield, the gripping member having a continuous, upwardly and outwardly facing slot means extending generally parallel with the upper extremity of the boat windshield and dimensioned to receive the first and second segments of the flexible member; and wherein
   the boat canopy is attachable to the windshield by continuously pushing the first and second segments of the flexible member into the slot means of the gripping member, and is detachable from the windshield by pulling the peripheral edge of the boat canopy upward and away from the gripping member.

2. The system recited in claim 1 wherein the flat plate portion, the riser means and the first and second segments comprise a unitary member of a molded flexible material.

3. The system recited in claim 1 wherein the slot means of the gripping member comprises first and second internal surfaces for respectively engaging the first and second segments of the flexible member.

4. The system recited in claim 1 wherein the boat windshield defines a plane, and wherein the slot means lies within the plane of the windshield.

5. The system recited in claim 1 wherein the boat canopy includes a strut and the windshield includes a side frame, the system further comprising means for rapidly attaching and detaching an end of the strut to the side frame.

6. The system recited in claim 5 wherein the windshield further comprises an extrusion across the top of the side frame with a lateral hole in the extrusion, and a quick release pin extending through the end of the strut and the side frame.

7. A sub-assembly for rapidly attaching and detaching a boat canopy with a boat windshield, comprising:
   a gripping member dimensioned for attachment to an upper extremity of a boat windshield, the gripping member having a continuous, upwardly and outwardly facing slot means, the slot means including two internal surfaces;
   a flexible member having a flat plate portion, riser means extending lateral from the flat plate portion and first and second locking segments extending laterally from the riser means; and wherein
   the first and second locking segments are dimensioned to extend through the slot means of the gripping member and respectively engage the first and second internal surfaces of the gripping member.

8. A method for rapidly attaching and detaching a boat canopy with a boat windshield, comprising the steps of:
   providing a gripping member fixed to an upper extremity of a boat windshield and having a continuous, upwardly and outwardly facing slot means extending generally parallel with the upper extremity of the boat windshield:
   providing an elongated, continuous flexible member having a flat plate portion and a riser means extending lateral from the flat plate portion, with first and second locking segments extending laterally from the riser means;

attaching the flexible member to the inside peripheral edge of a boat canopy;

attaching the flexible member to the gripping member by pushing the first and second locking segments into the slot means of the gripping member; and thereafter detaching the flexible member from the gripping member by pulling the peripheral edge of the boat canopy upwardly and away from the gripping member.

* * * * *